(12) United States Patent
Steuer et al.

(10) Patent No.: US 11,693,847 B2
(45) Date of Patent: *Jul. 4, 2023

(54) AUTOMATED IDENTIFICATION OF HARDWARE AND SOFTWARE COMPONENTS RELEVANT TO INCIDENT REPORTS

(71) Applicant: ServiceNow, Inc., Santa Clara, CA (US)

(72) Inventors: Rotem Steuer, Modin (IL); Tal Epshtein, Hod Hasharon (IL)

(73) Assignee: ServiceNow, Inc., Santa Clara, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/305,440

(22) Filed: Jul. 7, 2021

(65) Prior Publication Data

US 2021/0334269 A1    Oct. 28, 2021

Related U.S. Application Data

(63) Continuation of application No. 16/151,865, filed on Oct. 4, 2018, now Pat. No. 11,061,890.

(51) Int. Cl.
*G06F 16/23* (2019.01)
*G06F 16/25* (2019.01)
(Continued)

(52) U.S. Cl.
CPC ........ *G06F 16/2379* (2019.01); *G06F 16/252* (2019.01); *G06F 3/0482* (2013.01); *G06F 40/174* (2020.01)

(58) Field of Classification Search
None
See application file for complete search history.

(56) References Cited

U.S. PATENT DOCUMENTS 6,321,229 B1    11/2001   Goldman
6,609,122 B1     8/2003   Ensor
(Continued)

OTHER PUBLICATIONS

Marko Jantti, "Lessons Learnt from the Improvement of Customer Support Processes: a Case Study on Incident Management", PROFES 2009: Product-Focused Software Process Improvement pp. 317-331. (Year: 2009).*

(Continued)

*Primary Examiner* — Uyen T Le
(74) *Attorney, Agent, or Firm* — Fletcher Yoder PC

(57) ABSTRACT

Visualizations are automatically generated based at least on a received identifier that identifies a report. One or more data sets and one or more style configurations are retrieved from a shared visualization library via a backend API based on the received identifier and passed to a router component. The router component includes a switch that renders a score component, which generates a score visualization, if the retrieved data sets include score data. If the data sets include time series data, or the score visualization also includes a time series graph, the router component renders a time series component that passes the data sets and the style configurations to a parser that parses the data sets and the style configurations and outputs one or more highcharts options objects. A highcharts component generates the time series visualizations and/or adds the time series graph to the score visualization based on the highcharts options objects.

19 Claims, 11 Drawing Sheets

(51) Int. Cl.
  *G06F 3/0482* (2013.01)
  *G06F 40/174* (2020.01)

(56) References Cited

U.S. PATENT DOCUMENTS

| | | | |
|---|---|---|---|
| 6,799,189 B2 | 9/2004 | Huxoll |
| 6,816,898 B1 | 11/2004 | Scarpelli |
| 6,895,586 B1 | 5/2005 | Brasher |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangaajan |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,098,322 B2 | 8/2015 | Apte |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,613,070 B2 | 4/2017 | Kumar |
| 9,645,833 B2 | 4/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 10,284,587 B1 | 5/2019 | Schlatter et al. |
| 10,459,962 B1 | 10/2019 | Jayaraman et al. |
| 10,795,923 B2 | 10/2020 | Jayaraman et al. |
| 2009/0313219 A1 | 12/2009 | Gupta et al. |
| 2010/0131315 A1 | 5/2010 | Gilbert et al. |
| 2014/0372158 A1 | 12/2014 | Favero et al. |
| 2018/0253814 A1 | 9/2018 | Kaguma et al. |
| 2019/0164245 A1 | 5/2019 | Takacs |
| 2020/0090087 A1 | 3/2020 | Singh |

OTHER PUBLICATIONS

Raichelson, Lihi, and Pnina Soffer. "Merging event logs with many to many relationships." Business Process Management Workshops: BPM 2014 International Workshops, Eindhoven, The Netherlands, Sep. 7-8, 2014, Revised Papers 12. Springer International Publishing, 2015, 12 pages. (Year: 2014).*

ServiceNow Documentation, ServiceNow Attach configuration items to an incident, Aug. 29, 2018, 4 pages.

* cited by examiner

700

| ORIGINATOR | BOB SMITH |
| --- | --- |
| CREATED | 2018-02-07 9:56AM |
| SHORT DESCRIPTION | CAN'T CONNECT TO EMAIL |
| PROBLEM DESCRIPTION | MY EMAIL CLIENT IS NOT DOWNLOADING NEW EMAILS. I AM CONNECTED TO THE WIRELESS NETWORK AND CAN ACCESS THE INTERNET, BUT MY CLIENT KEEPS REPORTING THAT IT IS UNABLE TO ACCESS THE SERVER. |
| CATEGORY | EMAIL |
| ASSIGNED TO | ALICE JONES |
| STATUS | RESOLVED |
| RESOLUTION | BOB'S LAPTOP WAS CONNECTED TO THE "GUEST" WIRELESS NETWORK, WHICH IS OUTSIDE OF THE FIREWALL. I TOLD HIM THAT HE COULD EITHER USE THE VPN TO ACCESS HIS EMAIL, OR CONNECT TO THE "EMPLOYEE" WIRELESS NETWORK, WHICH REQUIRES THE PASSWORD BUT IS INSIDE THE FIREWALL. |
| RESOLVED TIME | 2018-02-07 10:10AM |
| CONFIGURATION ITEM(S) | CI_01234 ← 702 |

FIG. 7

| | |
|---|---|
| ORIGINATOR | BOB SMITH |
| CREATED | 2018-02-07 9:56AM |
| SHORT DESCRIPTION | CAN'T CONNECT TO EMAIL |

SUGGESTED CONFIGURATION ITEMS (PLEASE SELECT):

- ☐ REMOTE DESKTOP APPLICATION 1
- ☒ REMOTE DESKTOP APPLICATION 2
- ☐ REMOTE DESKTOP APPLICATION 3

[CONFIRM]

...WIRELESS NETWORK, WHICH REQUIRES THE PASSWORD BUT IS INSIDE THE FIREWALL.

| | |
|---|---|
| RESOLVED TIME | 2018-02-07 10:10AM |
| CONFIGURATION ITEM(S) | |

FIG. 8

| | |
|---|---|
| ORIGINATOR | BOB SMITH |
| CREATED | 2018-02-07 9:56AM |
| SHORT DESCRIPTION | CAN'T CONNECT TO EMAIL |
| PROBLEM DESCRIPTION | MY EMAIL CLIENT IS NOT DOWNLOADING NEW ... BUT ... THE |
| | PLEASE SELECT THE TYPE OF CONFIGURATION ITEM THIS REPORT RELATES TO: <br> ☒ APPLICATION <br> ☐ SERVER <br> ☐ NETWORK DEVICE <br> ☐ STORAGE DEVICE <br> ☐ SPECIAL SERVICE |
| | WIRELESS NETWORK, WHICH REQUIRES THE PASSWORD BUT IS INSIDE THE FIREWALL. |
| RESOLVED TIME | 2018-02-07 10:10AM |
| CONFIGURATION ITEM(S) | |

FIG. 9

AUTOMATED IDENTIFICATION OF HARDWARE AND SOFTWARE COMPONENTS RELEVANT TO INCIDENT REPORTS

CROSS-REFERENCE TO RELATED APPLICATION

This application is a continuation of U.S. application Ser. No. 16/151,865, entitled "AUTOMATED IDENTIFICATION OF HARDWARE AND SOFTWARE COMPONENTS RELEVANT TO INCIDENT REPORTS," filed on Oct. 4, 2018, which is herein incorporated by reference in its entirety for all purposes.

BACKGROUND

A remote network management platform may take the form of a hosted environment that provides application Platform-as-a-Service (aPaaS) services to users, particularly to operators of a managed network such as enterprises. Such services may take the form of web-based portals and/or software applications that enterprises, and both internal and external users thereof, may access through computational instances of the remote network management platform. One such software application may enable an agent, such as a customer service agent or information technology (IT) agent to resolve issues for internal or external users or to perform other tasks submitted by, or on behalf of, internal or external users.

SUMMARY

When an agent is tasked with assisting a user, a corresponding incident report can be generated and stored at one or more databases accessible to a user assistance system. In some scenarios, the incident report can be linked to a "configuration item"—that is, data that represents properties of a computing device and/or software application deployed on the managed network. By being able to view the configuration item linked to the incident report, the agent can better assist the user. For example, the incident report may be one of multiple incident reports relating to the configuration item, and thus the agent can view past issues related to the configuration item, see how those issues were resolved, and/or see how the configuration item might have changed over time.

In some scenarios, however, some incident reports might not be linked to any configuration items. This can occur for various reasons, such as human error. Additionally or alternatively, a configuration item that is relevant to a given incident report might not yet have been discovered by the remote network management platform. In other words, the device and/or application represented by the configuration item might actually exist in the managed network, but the existence of that device and/or application might not yet be recorded in one or more databases in which the remote network management platform stores information related to discovered configuration items.

The methods and systems described herein provide improvements to existing user assistance systems and enable configuration items to be automatically (or semi-automatically) and accurately linked to incident reports, particularly incident reports to which no configuration items have yet been linked.

Accordingly, a first example embodiment may involve a method performed by a computing device disposed within a computational instance of a remote network management platform associated with a managed network. One or more databases may also be disposed within the computational instance and may contain incident reports, each linked to one or more configuration items associated with the managed network. The one or more configuration items may represent properties of one or more of computing devices or software applications deployed on the managed network. The one or more databases may also contain a set of feature vectors, each representing information contained in fields of a different one of the incident reports. The one or more databases may also contain a computational model trained to generate the set of feature vectors from the incident reports.

The method may involve receiving an incident report to which no configuration item is linked. The method may also involve generating a feature vector for the incident report by applying the computational model to the incident report. The method may also involve comparing the feature vector to at least some of the set of feature vectors stored in the one or more databases. The method may also involve, based on the comparison, identifying a set of incident reports that are potentially related to the incident report, where members of the set of incident reports are each linked, in the one or more databases, to one or more members of a set of configuration items. The method may also involve selecting a particular configuration item of the set of configuration items to link to the incident report. The method may also involve linking the particular configuration item of the set of configuration items to the incident report. The method may also involve storing, in the one or more databases, the link between the incident report and the particular configuration item.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts an incident report, in accordance with example embodiments.

FIG. 8 depicts a graphical user interface (GUI) page, in accordance with example embodiments.

FIG. 9 depicts another GUI page, in accordance with example embodiments.

DETAILED DESCRIPTION

Figure 1:
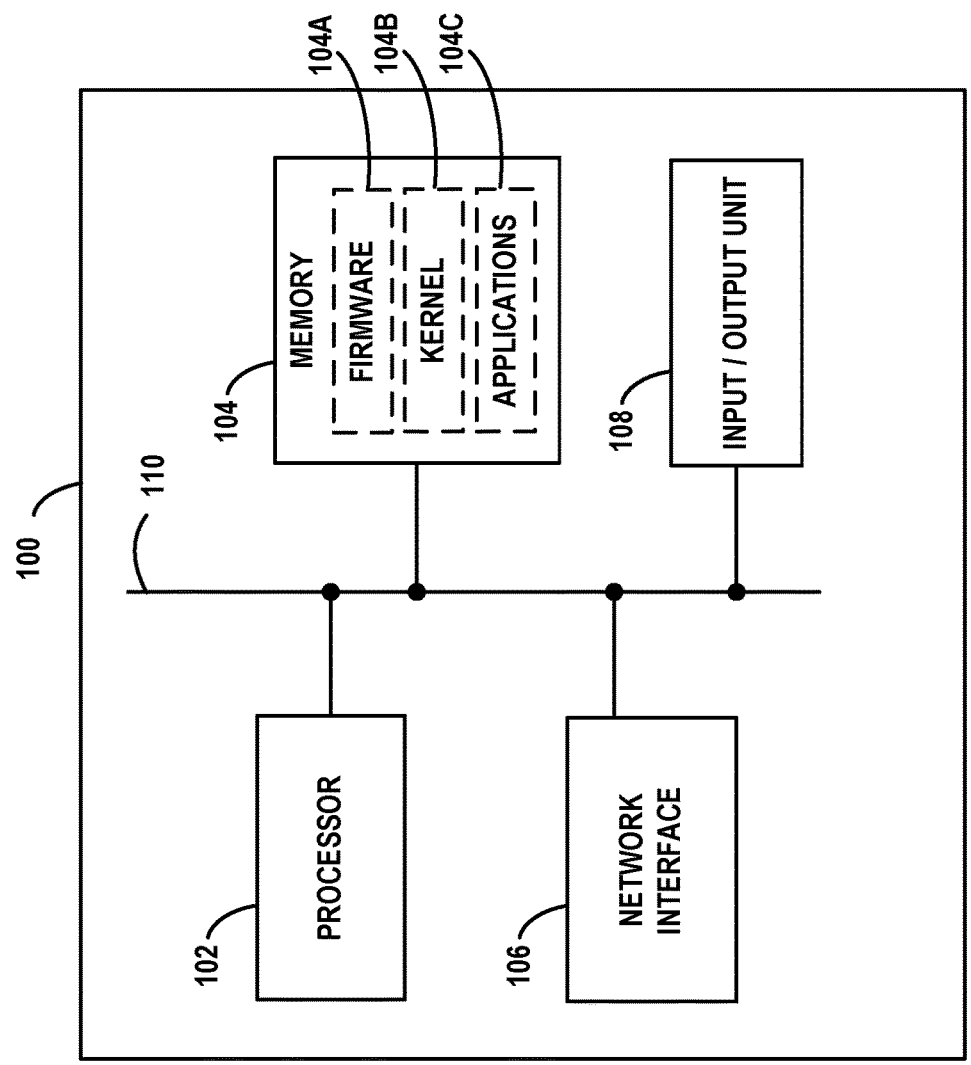
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
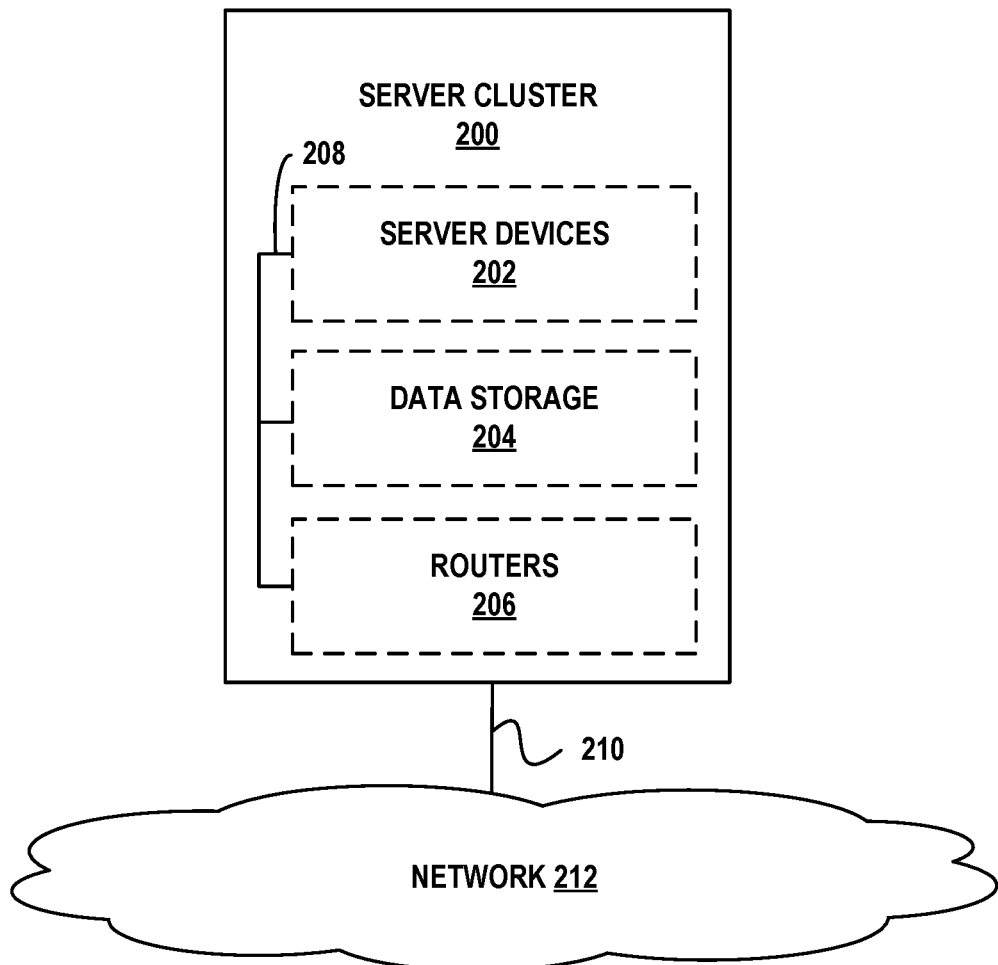
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
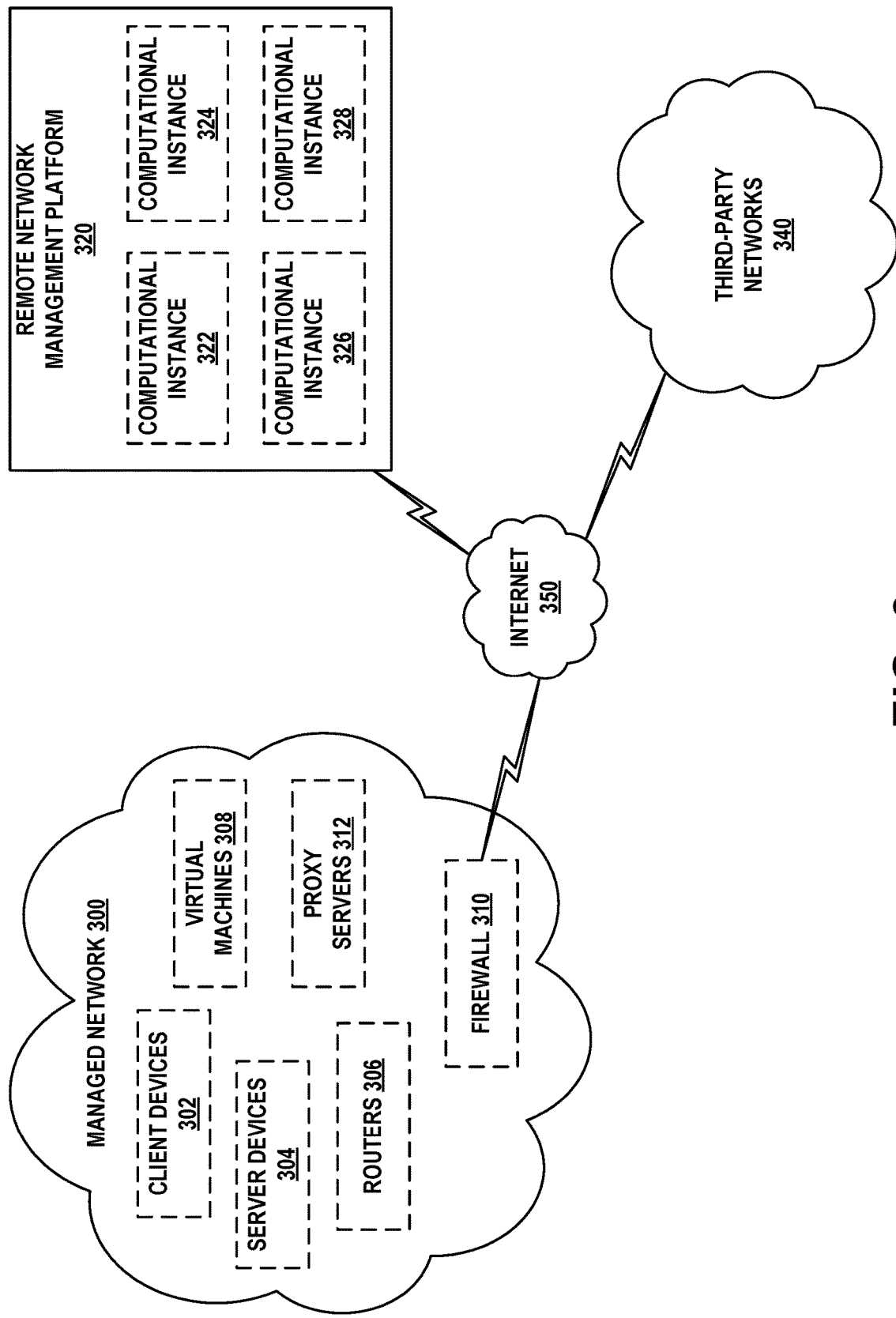
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
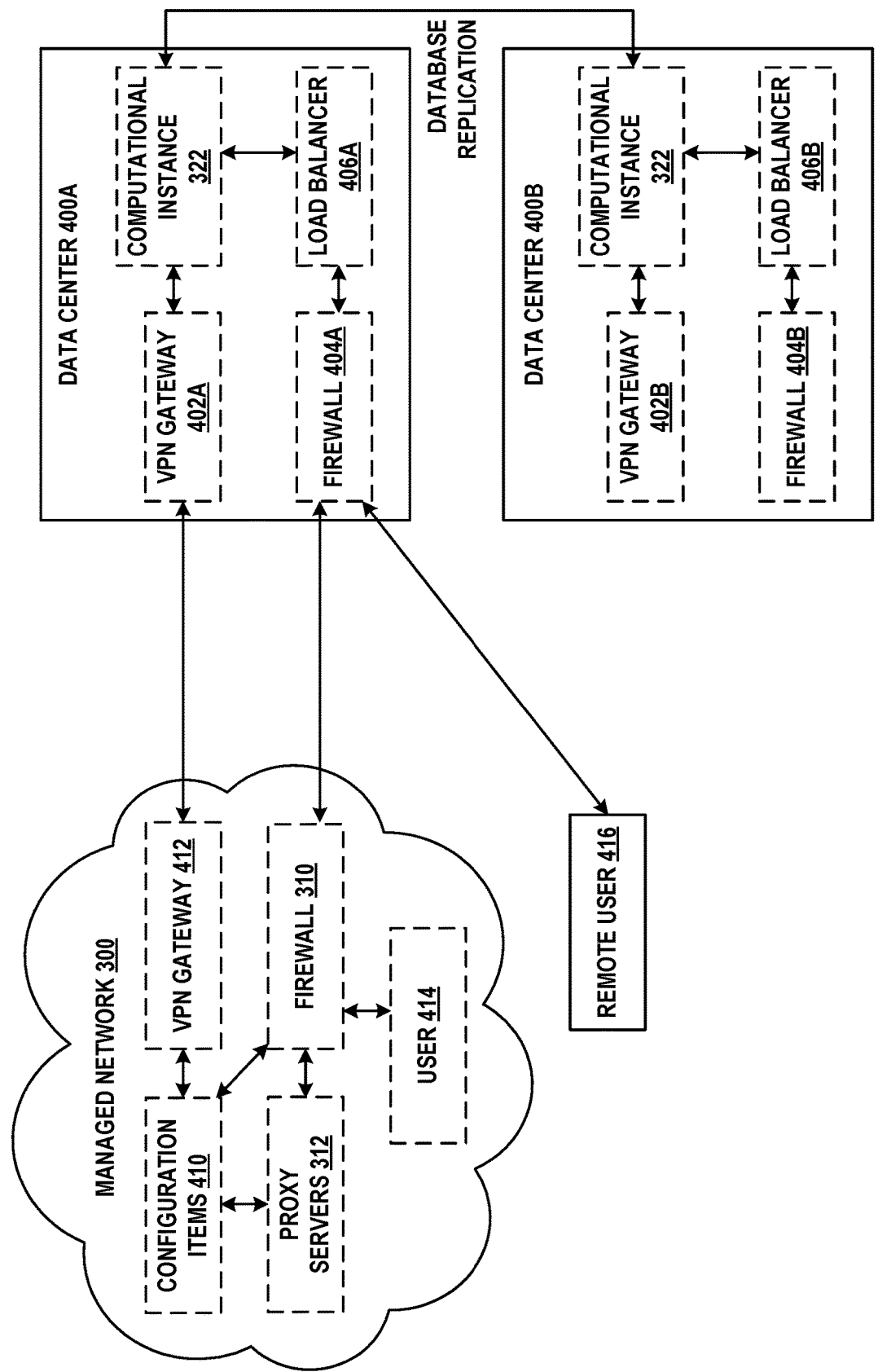
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
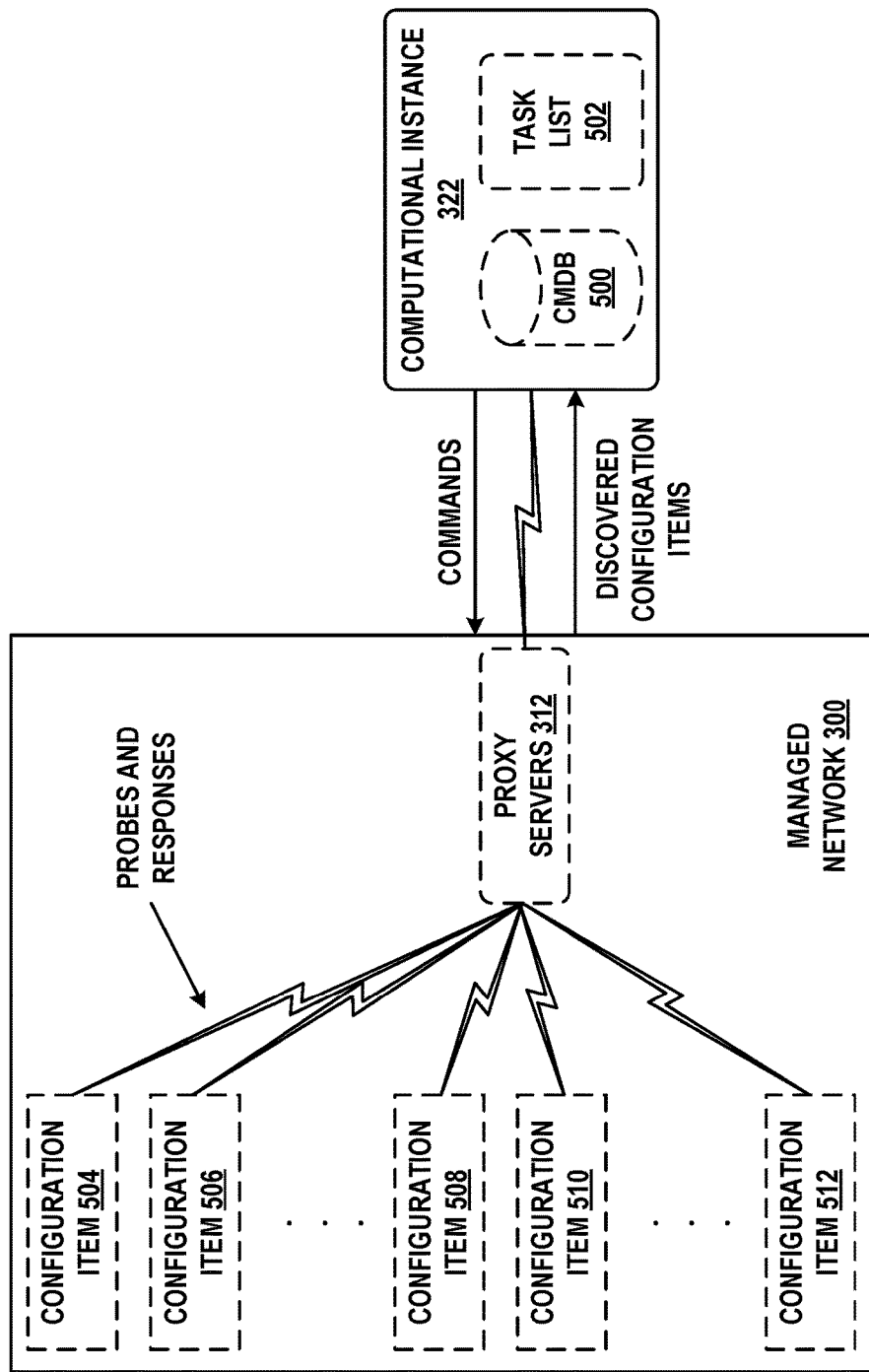
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
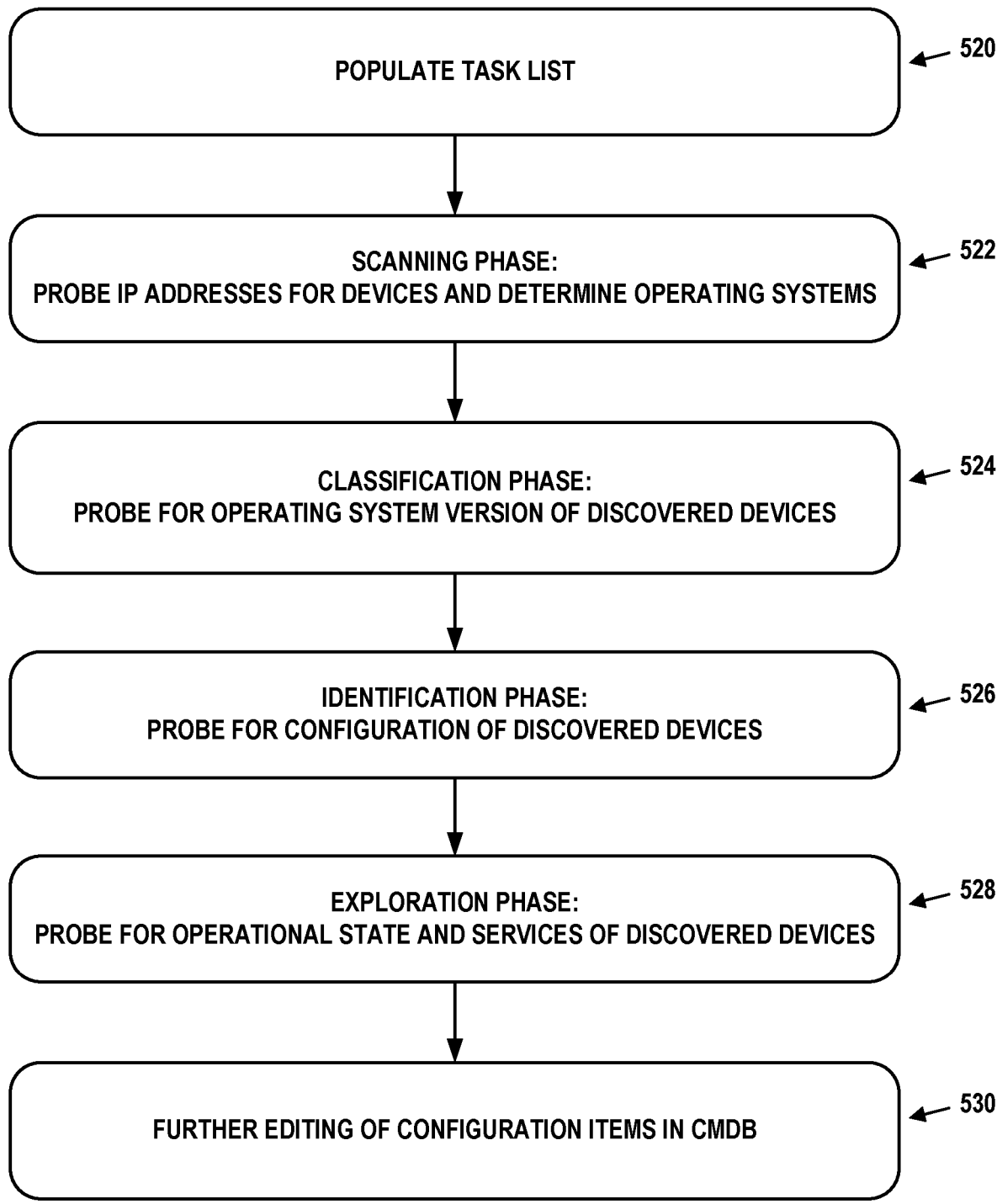
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Linking of Configuration Items to Incident Reports

As noted above, there may be scenarios where an agent, such as a customer service agent or IT agent, is tasked with assisting a user associated with a managed network 300. A user may submit a request for assistance with a particular task. A corresponding "incident report" can then be generated and stored at a one or more databases accessible to a user assistance system (i.e., computing device(s), software application(s), or a combination thereof configured for use by the agent in managing incident reports related to user assistance). The incident report can be generated automatically by the user assistance system or manually by the agent on behalf of the user. Incident reports may relate to tasks such as fixing defective software or hardware, completing a purchase of an item, installing software onto a user's computer, or updating software on a user's computer, among other possibilities. Although some examples described herein relate to an incident report in a scenario where a problem is to be solved, not all incident reports may involve solving problems.

An incident report can include a number of fields, at least some of which can have associated values. In an example type of incident report, example fields can include an originator of the incident (i.e., the requester) for assistance, a description of the incident (e.g., a description of a problem or a description of what task needs to be performed), an identifier of an agent to whom the incident is assigned, and/or a status of the incident, among other possibilities.

Other types of incident reports may be used, and these reports may contain more, fewer, and/or different fields.

In some scenarios, one or more configuration items can be linked to an incident report. Such linking can be done automatically by the user assistance system or manually by the agent. Each configuration item that is stored in the CMDB 500 can have a unique identifier (e.g., an alphanumeric identifier), and thus the act of linking a configuration item to an incident report can involve including, in the incident report (e.g., in a field of the incident report or elsewhere), the unique identifier of the configuration item. When an agent views the incident report, the unique identifier can be displayed for the agent. In addition, the user assistance system can retrieve the properties of the computing device(s), software application(s), etc. deployed on managed network 300 that the configuration item represents and display those properties for the agent.

Having one or more configuration items linked to an incident report can help the agent better provide assistance with respect to the incident report. For example, a user might encounter an issue with an application executing on the user's client device and an incident report can be created to address the issue. By linking the incident report to the relevant configuration item(s), such as the application, an operating system running on the client device, the client device itself, etc., and thus to the properties thereof, the agent might be able to view the properties represented by the configuration item(s) and identify what caused the issue to occur. As an example, the application might be incompatible with a current software version of the operating system, the application might need to be updated to a new version, and/or the operating system might need to be updated to a new version.

As another example, by consistently (and accurately) linking configuration item(s) to incident reports over time, a history of incident reports is created, which thus functions as a history of the configuration item(s) linked to those incident reports—namely, a history or past incidents, configuration changes, etc. involving the configuration item(s). As such, the agent can look up a history of incident reports to which the same or similar configuration items were linked, including incident reports associated with the same user or different users. This might provide the agent with useful insight as to how to better assist the user than if no such history was available. As a more particular example, when faced with resolving an issue regarding a configuration item, the agent can look up incident reports in which the same issue or a similar issue was encountered with regard to the same configuration item and subsequently resolved, which might provide the agent with information as to how to resolve the current issue. Other examples are possible as well.

In some scenarios, however, some incident reports might not be linked to any configuration items. This can occur for various reasons. For example, there may be a computational error with the user assistance system or a human error that results in no configuration item being linked to an incident report. For instance, a person creating or editing the incident report may fail to identify any related configuration items, despite doing so being in violation of common practice. As another example, at the time the incident report is created, the relevant configuration item(s) might not yet have been discovered (e.g., using the discovery process described above), and thus might not yet exist in the CMDB 500. In any event, it can be more difficult for an agent to provide assistance when no configuration items are linked to an incident report.

To address this problem, an agent might manually search for incident reports having no configuration items and then link configuration items to those incident reports. In addition, if no configuration item yet exists in the CMDB 500 for a given incident report, the agent can manually create one and link it to the incident report. However, this can be a difficult and inefficient process, particularly in large managed networks with hundreds or thousands of configuration items and with hundreds or thousands of users, many of whom may be submitting incident reports on a daily basis. Further, an effort to manually link configuration items to incident reports might result in the agent accidentally missing incident reports, linking the wrong configuration items to incident reports, or mistakenly creating duplicate configuration items in the CMDB 500, which can in turn result in inaccurate incident reports, multiple branches of historical incident reports for a configuration item instead of a desired single history, and/or other problems. Again, these problems can be more prevalent and harmful in large managed networks. In any event, it can be difficult for an agent to provide assistance using incomplete and/or inaccurate incident reports.

Accordingly, the methods and systems described herein provide improvements to existing user assistance systems and enable configuration items to be automatically (or semi-automatically) and accurately linked to incident reports, particularly incident reports to which no configuration items have yet been linked. In particular, a user assistance system can take an incident report to which no configuration item is linked, such as an incident report that has just recently been created or an existing incident report stored in memory, and generate a feature vector for it. For brevity's sake, an incident report to which no configuration item is linked will be referred to herein as a "new incident report," although the incident report might have been created at any point in the past.

The user assistance system can compare the feature vector of the new incident report with feature vectors for other, existing incident reports to which one or more configuration items are already linked. Based on that comparison, the user assistance system can identify, from the other incident reports, a set of one or more relevant incident reports that are likely to be related to the new incident report. Because members of the set of relevant incident reports are each linked in one or more databases to one or more configuration items, any one or more of the configuration items linked to any of the relevant incident reports of the set might be relevant to the new incident report. Thus, the user assistance system can link a particular configuration item from the set of relevant incident reports to the new incident report and store the link in the one or more databases.

These implementations provide technological improvements that are particular to computer networks and computing systems. For example, managed networks—particularly large managed networks with hundreds or thousands of computing devices—can cause tens or hundreds of incident reports to be generated each day, at least some of which may involve serious and urgent problems to be resolved. For at least this reason, it is desirable for such a managed network to have in place a mechanism for reliably and efficiently managing and resolving incidents. The remote network management platform 320 described herein provides such improvements.

Computing system-specific technological problems, such as inefficiency, unreliability, and complexity that can accompany the use of computer technology in data management (e.g., management of incident reports) can be wholly or partially solved by the implementations of this disclosure. For example, implementations of this disclosure provide at least semi-automated (e.g., with minimal or no user input) and accurate ways to link configuration items to incident reports, thereby reducing time spent linking configuration items manually (and potential errors that might result therefrom), reducing time taken to assess and act on incidents, and enabling agents to make more informed decisions for acting on incidents. Further, using one or more of the computational models described herein for comparing feature vectors can, in some scenarios, utilize less computer memory and less processor utilization than approaches based on conventional textual search.

These and other improvements are described in more detail below, though the operations described below are for purposes of example and that implementations may provide other improvements as well.

Although embodiments are discussed herein primarily with respect to linking a configuration item to an incident report to which no configuration item is linked, embodiments, techniques, processes, etc. described herein could be performed with respect to an incident report that already has one or more configuration items linked to it. For example, it could be desirable in some scenarios to periodically evaluate incident reports to determine whether the configuration items linked to those incident reports are the most relevant and thereby potentially improve the incident reports by linking more relevant configuration items to the incident reports. Consider for example a scenario in which the wrong configuration item (or perhaps a relevant configuration item, but not as relevant as other configuration items) is linked to a particular incident report. By evaluating the particular incident report, the user assistance system might determine that another, different configuration item is more relevant than the configuration item that is currently linked to the particular incident report and thus update the particular incident report in the one or more databases to replace the existing link with a link to the other configuration item. Other examples are possible as well.

Figure 6:
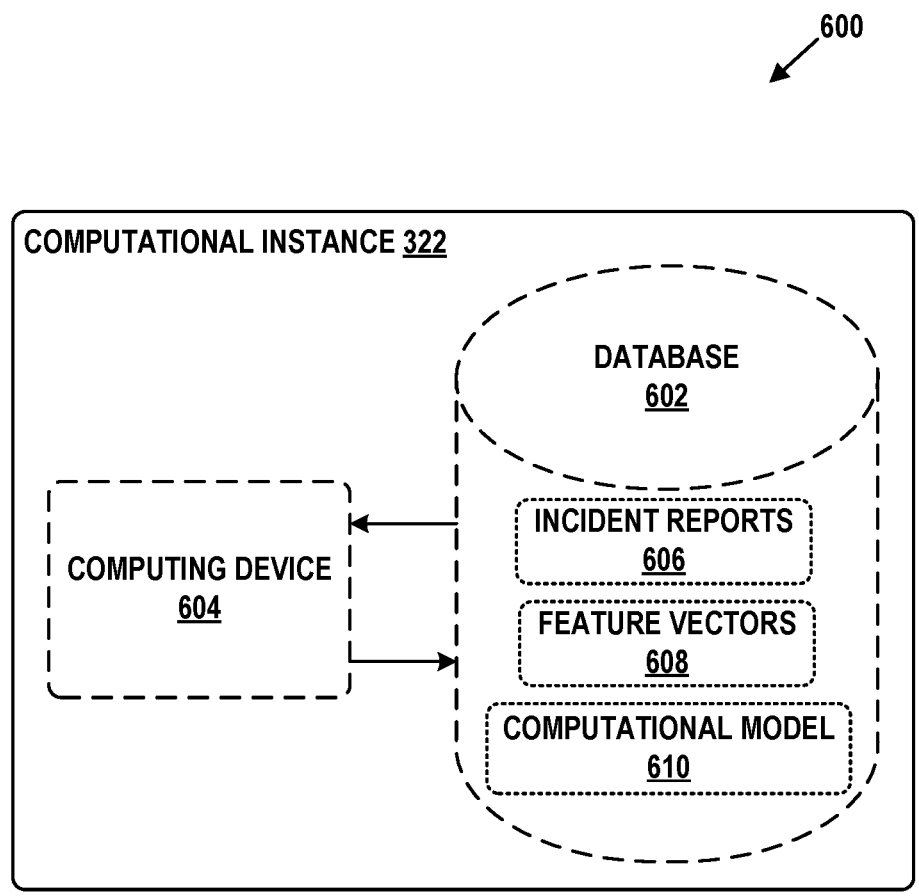
FIG. 6 depicts a system for linking configuration items to incident reports, in accordance with example embodiments.

An example process for linking configuration items is described in more detail with respect to FIG. 6. FIG. 6 depicts a user assistance system 600 for linking configuration items to incident reports, in accordance with example embodiments. The user assistance system 600 can be disposed within a computational instance of the remote network management platform 320, such as computational instance 322. As shown, computational instance 322 includes one or more databases 602 and a computing device 604. The database(s) 602 include incident reports 606, a set of feature vectors 608, and a computational model 610 that is trained to generate the set of feature vectors 608. The incident reports 606, feature vectors 608, and/or computational model 610 could each be included in a single database, or could be distributed or replicated across multiple databases. As an example, the computational model 610 can be contained in a dedicated machine learning database that is separate from database(s) 602.

Further, the computing device 604 can take various forms, such as computing device 100 described above. Operations described below as being carried out by computing device 604 could additionally or alternatively be carried out by a cluster of computing devices, such as server cluster 200.

For purposes of example, each incident report of the incident reports 606 in the database(s) 602 is assumed to be linked to one or more configuration items associated with managed network 300. However, the database(s) 602 can also include incident reports to which no configuration item is linked.

In some embodiments, the process for linking configuration items in the manner discussed above can occur in real-time or near-real-time, such as while the agent or other user is creating an incident report. Thus, by this process, one or more configuration items can be linked before the incident report is stored in the database(s) 602.

Additionally or alternatively, in some embodiments, the process can occur at a later point in time, such as periodically at a pre-scheduled time (e.g., every night at 10:00 pm), and/or can be run in the background while other processes are being performed. At that point in time, the computing device 604 can retrieve a group of new incident reports from the database(s) 602 and link configuration items to those incident reports. To facilitate this, computing device 604 can be configured to automatically retrieve (i.e., request and receive, from the database(s) 602 or from elsewhere), at a particular frequency one or more incident reports to which no configuration items is/are linked. Additionally or alternatively, computing device 604 can receive an input (e.g., from the agent, an administrator, or other user) indicating a frequency at which to receive incident report(s) to which no configuration item is/are linked and then retrieve the incident report(s) at that frequency.

Thus, new incident reports that were created since the last time the process was executed can be automatically evaluated for configuration item linking. Similarly, existing incident reports that were updated since the last time the process was executed can also be automatically evaluated for configuration item linking.

In some embodiments, semi-automatic linking of a configuration item to a new incident report can involve the user assistance system 600 automatically (i) evaluating the new incident report, (ii) determining suggested configuration items that are potentially relevant to the new incident report, and (iii) displaying the suggested configuration items in order to provide the agent with the final decision of which suggested configuration item to link to the new incident report. In contrast, automatic linking of a configuration item to a new incident report can, in some embodiments, involve the user assistance system 600 automatically evaluating the new incident report, determining a potentially-relevant configuration item to link to the new incident report, and then linking the configuration item to the new incident report without prompting the agent for approval. Other examples of semi-automatic and automatic linking of configuration items are possible as well.

When the computing device 604 receives a new incident report—whether it be an incident report entered via a graphical user interface, an incident report received from another computing device over a network, or an incident report received from the database(s) 602—the process involves determining which of the existing incident reports 606 is/are potentially relevant to the new incident report. To facilitate this, the computing device 604 can compare the new incident report to at least some of the existing incident reports 606. More particularly, the computing device 604 can apply the computational model 610 to the new incident report to generate a feature vector for the new incident report and then compare the feature vector of the new incident report to at least some members of the set of feature vectors 608 stored in the database(s) 602.

The computational model 610, when applied to the new incident report, can analyze textual content of the new incident report (i.e., values contained in fields of the new incident report, such as a description of the incident) and generate an output in the form of a feature vector that represents the new incident report. To facilitate this, the computational model 610 can take the form of any one machine learning model or combination of machine learning models. For example, the computational model 610 can be a bag-of-words (BOW) model, a continuous bag-of-words (CBOW) model, a word vector model, or a paragraph vector model, each of which can be configured to provide semantic representations of words, paragraphs, and text strings in the form of feature vectors. Other types of models are possible as well.

Furthermore, any feature vector of the set of feature vectors 608 to which the feature vector of the new incident report is compared can be similarly generated using the computational model 610 or using a different model that is not stored in the database(s) 602. Thus, each feature vector in the set of feature vectors 608 represents information contained in fields of a different one of the incident reports 606.

To appreciate how a computational model such as computational model 610 can be applied to a given incident report, consider the following examples.

A BOW model can represent text in an incident report as a multiset of its words. For example, consider a scenario in which there are two incident reports, each of which, for the sake of simplicity, contains only one sentence. Namely, a first incident report contains the text "My remote desktop application isn't working" and a second incident report contains the text "I can't access my remote desktop application." Using a BOW model, each of these reports can be represented as a feature vector. In the form of a JSON object with key/value pairs, for example, the feature vector for the first incident report can be {"My":1, "remote":1, "desktop": 1, "application":1, "isn't":1, "working":1}, and the feature vector for the second incident report can be {"I":1, "can't": 1, "access":1, "my":1, "remote":1, "desktop":1, "application": 1}, where the keys are the words, and the values represent a number of occurrences of each word. Further, from the example above, two more feature vectors can be constructed and stored in the database(s) 602 in the set of feature vectors 608, which each account for all distinct words used across both incident reports. For example, the feature vector for the first incident report can be {"My":1, "remote":1, "desktop":1, "application":1, "isn't":1, "working":1, "I":0, "can't":0, "access":0}, and the feature vector for the second incident report can be {"My":1, "remote":1, "desktop":1, "application":1, "isn't":0, "working":0, "I":1, "can't":1, "access":1}. As more incident reports are considered, the number of distinct words accounted for in the feature vectors across all the incident reports might increase.

A CBOW model can be used in accordance with a BOW model or with other models to predict the probability of a word based on a predefined window of surrounding context words (e.g., within a window of two words from where the output word is predicted to be), regardless of the order in which the context words appear. As a simplified example, given an incident report stating "There's a problem with my remote application. I can't access it," a CBOW model can predict that the word "desktop" is absent from the incident report using context words within a window of two context words of where the word "desktop" is predicted to be (e.g., "my," "remote," "application," and "I"). Thus, the CBOW model might indicate that the incident report refers to a "remote desktop application."

Other machine learning algorithms and natural language processing techniques can be applied to incident reports in accordance with the present disclosure, in addition to or alternatively to those described above.

Any one or more of the models described above and/or other models can be used to compare two feature vectors and determine similarity between the two feature vectors. Thus, once a "new" feature vector is generated for the new incident report, the computing device 604 can use any one or more of such models to compare the new feature vector to feature vectors from the set of feature vectors 608 stored in the database(s) 602. Based on this comparison, the computing device 604 can determine which members of the set of feature vectors 608 match, or are most similar to, the new feature vector. Other comparison techniques could be used in addition to or alternatively to a computational model.

As an example, the act of comparing the new feature vector with an existing feature vector from the set of feature vectors 608 can involve searching for a particular set of words that are common between the two feature vectors. The set of words can be configured to include words that are expected to be associated with configuration items. For example, the set of words can include more general words such as "application," "service," "IP address," and "URL." As another example, the set of words can include more specific words, such as specific IP addresses (e.g., "10.89.70.66"), types of databases (e.g., "flight service database"), or applications ("virtualization hypervisor application"), that are associated with existing configuration items in CMDB 500. When new configuration items are discovered or otherwise added to CMDB 500, the computing device 604 can update the set of words to include words related to the new configuration items. Similarly, when a configuration item has been updated (e.g., an IP address of an application changes), the computing device 604 can update the set of words accordingly. For example, the computing device 604 might receive, on a repeated basis, notifications of updated configuration items or can determine that configuration items have changed in other ways. Thus, the computing device 604 can keep the set of words up-to-date and more accurately determine relevant configuration items for new incident reports.

In addition, the computing device 604 can be configured to exclude or certain words from the set of words or otherwise weight certain words lower than others. Words that might be subject to this can include words such as "a," "an," "the," "I," "my," and/or other words that often appear with high frequency in incident reports, but that might not be important when comparing feature vectors for the purposes described herein. One way to do this is to normalize feature vectors so that common words or otherwise undesirable words are filtered out. Equation 1 is an example of a term frequency-inverse document frequency (tf-idf) weighting scheme for accomplishing this, where c is the number of times the word, w, appears in incident report, d, T is the total number of incident reports that are being considered (e.g., for the purposes of comparing a new feature vector with a set of existing feature vectors), and R is the total number of incident reports in which w appears.

$$tf\text{-}idf(w,d)=c*(T/R) \qquad \text{(Equation 1)}$$

Other types of normalization or preprocessing could be performed on any given feature vector before the feature vector is used for comparison with other feature vectors.

As a more particular example of comparing feature vectors, and in line with the BOW example described above, three of the words in the set of words might be "remote," "desktop," and "application." The computing device 604 can compare the feature vector of the new incident report with the two example feature vectors described above, with a focus on the three words noted above.

Consider for instance a first new incident report with the text "Help me fix this remote desktop application." The feature vector generated for the first new incident report would thus have values of 1 in the fields (e.g., the keys, in a JSON object) associated with the words "remote," "desktop," and "application." As a result, the output of the comparison might have a score of three (due to the three words in common between the feature vectors) or some other type of value representing the degree of similarity between the feature vectors, and thus one or both of the existing incident reports might be considered to be relevant to the first new incident report. In contrast, consider a second new incident report with the text "My desktop icons are disappearing." The feature vector generated for the second new incident report would thus have a value of 1 in the fields associated with the words "my" and "desktop" (although "my" might be excluded because it is a common word). As a result, the output of the comparison might have a score of one, and thus the two existing feature vectors incident report might be considered to be less relevant to the second new incident report than to the first new incident report. Other techniques for determining similarity between feature vectors, and variations of the above-described techniques, are possible as well.

Based on the comparison of the new feature vector with the set of feature vectors from the database(s) 602, the computing device 604 can identify a set of one or more relevant incident reports related to the new incident report. In particular, the members of the identified set of relevant incident reports can each be linked, in the database(s) 602, to one or more members of a set of one or more configuration items. Phrased another way, when the computing device 604 has identified a relevant incident report and included it in the set of relevant incident reports, the computing device 604 can consider any one or more configuration items that are linked to the relevant incident report to be relevant to the new incident report.

Alternatively, a vocabulary including a particular number of words, n (e.g., 10,000, 50,000, or 100,000, etc.) may be predetermined. A count of these words in each incident report may be represented as a vector of length n with each element representing the respective count. More words can be added to the vocabulary by extending the length of the vectors. The similarity of a pair of incident reports can be determined based on a Euclidean distance calculation over their respective vectors. In some embodiments, common words (e.g., "and", "or", "the", "I", "my", "a", "an", etc.) may be omitted from the vocabulary.

The act of identifying the set of relevant incident reports can take various forms. In an example, the act can involve including, in the set of relevant incident reports, only incident reports with feature vectors that have at least a predetermined extent of similarity with the new feature vector, such as feature vectors that resulted in a score or other similarity value that exceeds a predetermined threshold (e.g., a score of five or higher, meaning that the feature vector and the new feature vector must contain at least five common words from a predefined set of words in order for its corresponding incident report to be included in the set of relevant incident reports). As such, the extent of similarity between feature vectors functions as a confidence in how relevant an existing incident report, and thus the existing incident report's linked configuration item(s), is to the new incident report.

Additionally or alternatively, as another example, the act can involve including, in the set of relevant incident reports, the top N most relevant incident reports —namely, the N incident reports that have the highest extents of similarity with the new incident report, where N is greater than zero. The act of including the top N most relevant incident reports can be performed regardless of whether the similarity scores of any of the top N incident reports fall below a predetermined extent of similarity, or can involve including only incident reports having extents of similarity above the predetermined extent of similarity, even if that means having less than N incident reports included in the set of relevant incident reports. Other examples of identifying the set of relevant incident reports are possible as well, such as examples including other criteria used as a basis for deeming an incident report to be relevant for the purposes of the disclosed process.

Other techniques, such as document classification algorithms, can be used to identify relevant incident reports, in addition to or alternatively to the techniques described above.

Upon identifying the set of relevant incident reports related to the new incident report, the computing device 604 can select a particular configuration item of the set of configuration items to link to the new incident report and link the particular configuration item to the new incident report. A particular configuration item can be linked to the new incident report in the manner discussed above (e.g., by including a unique identifier of the configuration item in a field of the incident report) or in another manner. In some embodiments, more than one configuration item can be linked to the new incident report.

FIG. 7 depicts a representative incident report 700, in accordance with example embodiments. In particular, FIG. 7 shows a configuration item linked to the incident report 700. As shown, the incident report 700 includes various fields, including a configuration item(s) field 702 having a value of CI 01234, which is a unique alphanumeric identifier for the configuration item that has been linked to the incident report 700. In the scenario depicted by the incident report 700, the configuration item might be a software application and/or a computing device. Other example incident reports and representations of linked configuration items are possible as well.

The incident report 700 shown in FIG. 7 is an example of the benefits provided by being able to link configuration items in the manner discussed herein. Given that a relevant configuration item is available to an agent reviewing the incident report, the agent may be able to more rapidly focus on issues specific to that configuration item, rather than having to first narrow down the scope of the problem to the configuration item. Furthermore, in line with the discussion above, the ability to at least semi-automatically evaluate and link a configuration item to a new incident report provides benefits as well, such as reducing or eliminating the amount of time spent manually linking configuration items to incident reports.

In some embodiments, the acts of selecting a particular configuration item of the set of configuration items to link to the new incident report and linking the particular configuration item can involve selecting and linking up to a predetermined number of configuration items (e.g., three). Additionally or alternatively, the act can involve selecting and linking only configuration items from the top M relevant incident reports from the set of relevant incident reports, where M is greater than zero. These top M relevant incident reports may have the highest extent of similarity with the new incident report. Or, only incident report(s) in the set that have extents of similarity greater than a predetermined extent of similarity may be linked. Other examples are possible as well.

In some embodiments, the acts of selecting a particular configuration item of the set of configuration items to link to the new incident report and linking the particular configuration item to the new incident report can involve receiving input from the agent (or another user) that specifically selects a configuration item to be linked to the new incident report and then linking the configuration item that the agent or other user has specifically selected to be linked to the new incident report. Additionally or alternatively, the acts can involve receiving input from the agent or other user that specifically selects a relevant incident report from the set of relevant incident reports and linking one or more configuration items from the selected relevant incident report to the new incident report.

To facilitate this, the computing device 604 can generate and provide for display, on a GUI, a suggestion region that includes potentially relevant configuration items from the set of relevant configuration items and from which the agent or other user (e.g., the user submitting the incident report on their own behalf) can select for linking to the new incident report. The set of relevant configuration items can include any one or more of the configuration items from the set of relevant incident reports and the criteria for inclusion of a configuration item in the suggestion region can be the same as those described above or can include different criteria. Further, the suggestion region can be included on a different GUI page from a GUI page where the new incident report is created or displayed, or the suggestion region can take the form of a popup window overlaid on the new incident report.

FIG. 8 depicts an example GUI page where a popup window 800 is overlaid over the incident report 700 from FIG. 7. As shown, the configuration item(s) field 702 is empty, since this page would usually be shown before a configuration item has been linked to the incident report 700. Further, the popup window 800 includes a prompt for the user to select one or more of the suggested set of relevant configuration items to be linked to the incident report 700. These configuration items are Remote Desktop Application 1, Remote Desktop Application 2, and Remote Desktop Application 3. Here, the configuration items may be listed by name rather than by their unique identifier for purposes of readability.

After a configuration item has been linked to the new incident report, the computing device 604 can display the unique identifier for the configuration item and/or can use the unique identifier to query the CMDB 500 for information associated with the configuration item (e.g., the name of the configuration item or other attributes thereof) and then display the information upon receipt from the CMDB 500.

To help the computing device 604 link or suggest the most relevant configuration item(s), the computing device 604 can be configured to prompt the agent or other user to input information that the computing device 604 can use for narrowing down which existing incident reports, and thus which configuration item(s), might be relevant.

In some embodiments, the information entered by the agent or other user in response to a prompt can be used in generating and comparing feature vectors that represent incident reports. For example, some or all of the information provided by the agent or other user can be included by the computing device 604 in the set of words used for comparing feature vectors.

In some embodiments, the information entered by the agent or other user in response to a prompt can be used in generating and comparing feature vectors that represent configuration items and the attributes associated therewith (e.g., IP address(es), service name, operating system, etc.). Such feature vectors can be generated and compared in the same manner as described above or in a different manner.

Further, in some embodiments, and in addition to or alternatively to using feature vectors to link relevant configuration item(s) to a new incident report, the computing device 604 can determine whether any information associated with existing configuration items in the CMDB 500 match any of the words, phrases, etc. present in the information provided by the agent or other user. For example, if the computing device 604 determines that at least one of the words, phrases, etc. in the information matches information in the CMDB 500 that is associated with a particular configuration item (e.g., attributes of the configuration item), the computing device 604 can (i) link the configuration item to the new incident report or (ii) include the configuration item in the set of relevant configuration items from which the agent or other user can select.

In some embodiments, the computing device 604 can prompt for information related to configuration items such as an IP address, URL, service name, domain name, and/or operating system of the computing device involved in the incident, among other possible information. For example, the computing device 604 can generate and display on a GUI page a region including such a prompt, as well as GUI elements (e.g., text boxes, radio buttons) that the agent or other user can use to respond to the prompt. The region in which the prompt is displayed can be included on a different GUI page from a GUI page where the new incident report is created or displayed, or the region can take the form of a popup window overlaid on the new incident report.

Further, in some embodiments, the computing device 604 can obtain helpful information from the agent or other user using a question tree—that is, a decision tree structure comprised of question nodes whose answers are linked to subsequent question nodes, until a path through the graph is complete (e.g., the agent has answered each question in the path). The region(s) in which the questions from the question tree are displayed can be included on different GUI page(s) from a GUI page where the new incident report is created or displayed, or the region(s) can take the form of a popup window (or series of popup windows) overlaid on the new incident report.

An example question tree path is described in detail below. While the path relates to some example questions prompting selection from predefined answers, in other embodiments, the computing device 604 might enable the agent or other user to manually enter (e.g., in a text box) the answer to any one or more of the questions in the question tree.

In an example question tree path, a first question (i.e., a root node in the question tree) can prompt the agent or other user to select the type of configuration item that the new incident report relates to and can provide the following answer choices: Application, Server, Network Device, Storage Device, and Special Service. Each of the answer choices can lead to a distinct node (i.e., subsequent question) branching from the root node.

FIG. 9 depicts another GUI page—namely, a page where a popup window 900 is overlaid over the incident report 700 from FIG. 7. Again, as shown, the configuration item(s) field 702 is empty, since this page would be shown before a configuration item has been linked to the incident report 700.

Further, as shown, the popup window 900 includes the question for a configuration item type, as described above.

Continuing the example question tree path, upon the agent or other user selecting "application" as the answer to the first question, the computing device 604 can display (e.g., in the same popup window or in a different window or page) a second question prompting the agent or other user to select an application type and can provide the following answer choices: Single Sign-on Application, Remote Desktop Application, Virtualization Hypervisor Application, Database Application, Messaging Application, Web Application, and Other.

Next, upon the agent or other user selecting "Remote Desktop Application" as the answer to the second question, the computing device 604 can display (e.g., in the same popup window or in a different window or page) a third question prompting the agent or other user to select an exact remote desktop application and can provide the following answer choices: Remote Desktop Application 1, Remote Desktop Application 2, and Remote Desktop Application 3.

Lastly, upon the agent or other user selecting "Remote Desktop Application 2" as the answer to the third question, the computing device 604 can display (e.g., in the same popup window or in a different window or page) a fourth question prompting the agent or other user to provide (e.g., via a text box) details for each of a plurality of fields that relate to the configuration item including: a server name, a server version, one or more IP addresses, and an operating system that runs on Remote Desktop Application 2.

Using the information entered in the plurality of fields in response to the fourth question, the computing device 604 can automatically match words and/or phrases from the plurality of fields with information stored in the CMDB 500 for configuration items to determine whether any one or more of the configuration items in the CMDB 500 are relevant to the new incident report. Again, if there is a match, the computing device 604 can either (i) link the configuration item to the new incident report or (ii) include the configuration item in the set of relevant configuration items from which the agent or other user can select. The computing device 604 could perform other actions in response to a match as well.

In some embodiments, the GUI page shown in FIG. 9 can be displayed before or after the GUI page shown in FIG. 8. For example, as part of the process of identifying and providing a suggested list of configuration items to the agent or other user for a new incident report, the computing device 604 can first prompt the agent or other user to answer a series of questions, including the question shown in FIG. 9. Using the answers to the questions, the computing device 604 can then identify relevant configuration items and provide a popup window (e.g., popup window 800) that includes the relevant configuration items as suggestions and prompts the agent or other user to select one of the configuration items to link to the new incident report.

VI. Example Operations

Figure 10:
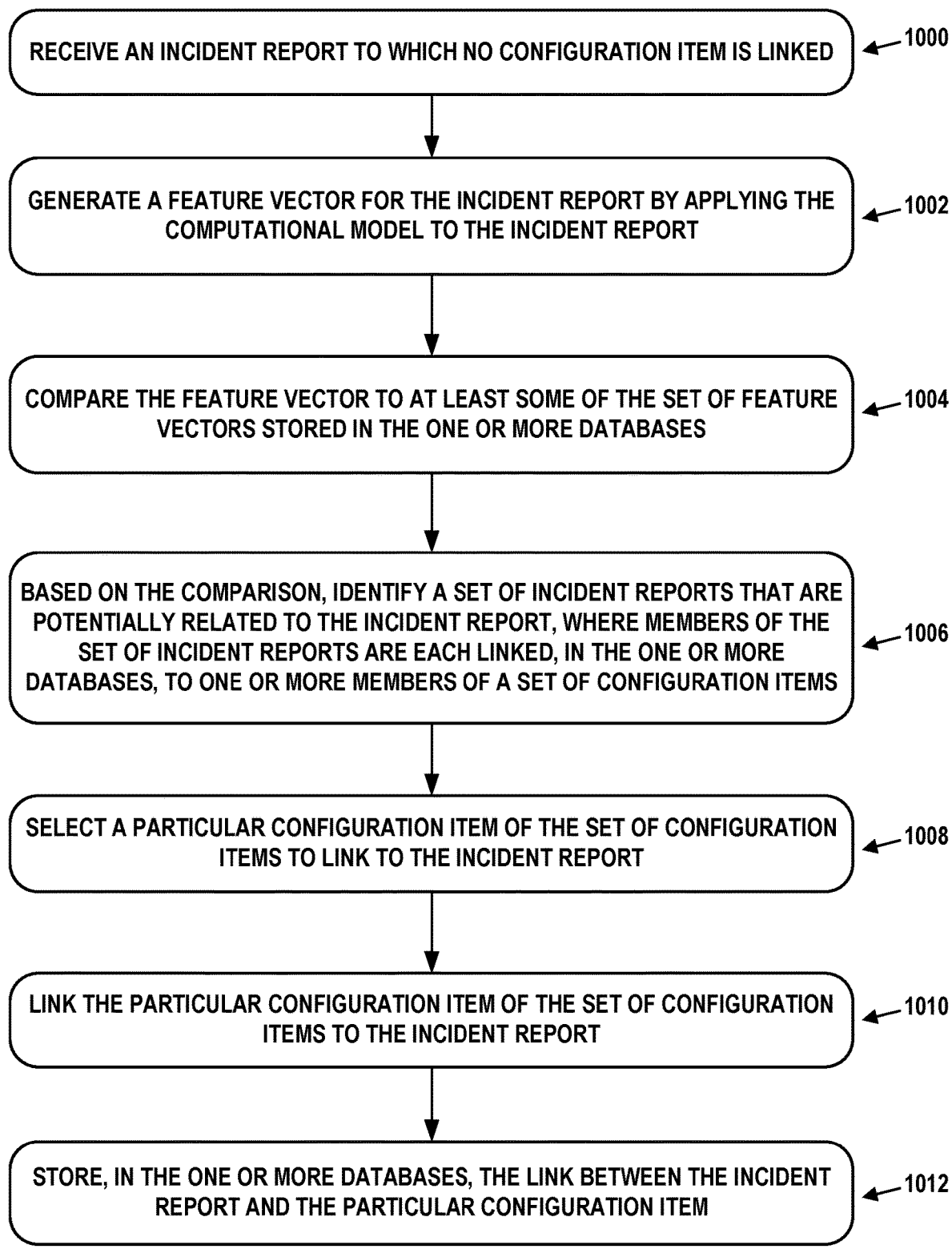
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Furthermore, at least some operations of the process illustrated by FIG. 10 may involve one or more databases (e.g., database(s) 602) that contains incident reports, each linked to one or more configuration items associated with the managed network, where the one or more configuration items represent properties of one or more of computing devices or software applications deployed on the managed network. The database(s) also contain a set of feature vectors, each representing information contained in fields of a different one of the incident reports. The database(s) also contain a computational model trained to generate the set of feature vectors from the incident reports.

Block 1000 involves receiving an incident report to which no configuration item is linked.

Block 1002 involves generating a feature vector for the incident report by applying the computational model to the incident report.

Block 1004 involves comparing the feature vector to at least some of a set of feature vectors stored in the one or more databases.

Block 1006 involves, based on the comparison, identifying a set of incident reports that are potentially related to the incident report. Members of the set of incident reports may each be linked, in the one or more databases, to one or more members of a set of configuration items.

Block 1008 involves selecting a particular configuration item of the set of configuration items to link to the incident report.

Block 1010 involves linking the particular configuration item of the set of configuration items to the incident report.

Block 1012 involves storing, in the one or more databases, the link between the incident report and the particular configuration item.

As discussed above, the incident report can be entered by an agent or other user via a graphical user interface provided by the computing device or the incident report can be an existing incident report received from the one or more databases. In some embodiments, for instance, the act of receiving the incident report to which no configuration item is linked may involve generating and providing, for display on a graphical user interface, an incident report page for (i) displaying fields of the incident report and (ii) receiving values in at least one of the fields. Further, in such embodiments, the act of receiving the incident report to which no configuration item is linked may involve receiving the values, where the values do not include a unique identifier of a configuration item.

Additionally or alternatively, in some embodiments, the act of receiving the incident report to which no configuration item is linked may involve requesting and receiving, from the one or more databases, the incident report to which no configuration item is linked.

In some embodiments, the act of comparing the feature vector to at least some of the set of feature vectors stored in the one or more databases may involve determining similarity values, each representing an extent of similarity between the feature vector and a different member of the set of feature vectors. Further, in such embodiments, the act of identifying the set of incident reports that are potentially related to the incident report may involve including, in the set of incident reports, members whose feature vectors each have at least a predetermined extent of similarity with the feature vector generated for the incident report.

In some embodiments, the process may involve periodically identifying, and linking configuration items to, incident reports from the one or more databases to which no configuration items are linked. As noted above, the process can also be performed with respect to incident reports to which configuration items are already linked, such as for the purposes of reevaluating the incident reports, replacing the link with another, etc.

In some embodiments, the act of linking the particular configuration item of the set of configuration items to the incident report may involve automatically linking the particular configuration item of the set of configuration items to the incident report without receiving user input instructing the computing device to link the particular configuration item of the set of configuration items to the incident report.

In some embodiments, the act of selecting the particular configuration item of the set of configuration items to link to the incident report may involve generating and providing, for display on a graphical user interface, a page including a suggestion region for (i) displaying potentially relevant configuration items from the set of configuration items, and (ii) receiving selection of the particular configuration item from the set of configuration items.

In some embodiments, the process may involve generating and providing, for display on a graphical user interface, a page including the incident report and a region for prompting and receiving user input of attributes of a configuration item that is potentially relevant to the incident report. The process may also involve determining that at least some of the received attributes match attributes of an existing configuration item stored in a configuration management database (CMDB) disposed within the computational instance. In such embodiments, the acts of selecting the particular configuration item of the set of configuration items to link to the incident report and linking the particular configuration item to the incident report may involve, in response to determining that at least some of the received attributes match attributes of the existing configuration item stored in the CMDB, either: automatically linking the existing configuration item to the incident report, or generating and providing for display, on the graphical user interface, a suggestion region for (i) displaying the existing configuration item and (ii) receiving selection of the existing configuration item to link to the incident report. Further, in such embodiments, the received attributes may include one or more of: an IP address, a URL, a service name, or a domain name.

In some embodiments, the process may involve generating and providing, for display on a graphical user interface, a page including a popup window overlaid on the incident report. The popup window may be for displaying questions arranged in a decision tree structure, and the questions may be tailored to elicit input of attributes of a configuration item to link to the incident report.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a processor; and
a memory, accessible by the processor, and storing instructions that, when executed by the processor, cause the processor to perform operations comprising:
receiving an incident report that is not linked to a configuration item;
generating a feature vector for the received incident report, wherein the feature vector comprises a plurality of keys, each key of the plurality of keys having a respective key value, wherein each key of the plurality of keys corresponds to a respective word of a plurality of words in the incident report, and wherein the respective key value for each of the plurality of keys represents a number of occurrences of the respective word in the incident report;
comparing the generated feature vector to one or more feature vectors of a plurality of feature vectors stored in a database, wherein each of the plurality of feature vectors corresponds to a respective past incident report of a plurality of past incident reports stored in the database;
based on the comparison, identifying a set of candidate incident reports of the plurality of past incident reports that are potentially related to the received incident report;
determining whether a particular configuration item of a plurality of configuration items stored in the database is associated with the incident report based on whether the particular configuration item is linked to at least a threshold number of incident reports from the set of candidate incident reports;
in response to the determination that the particular configuration item of the plurality of configuration items is associated with the received incident report, linking the particular configuration item to the received incident report; and
storing, in the database, the link between the received incident report and the particular configuration item.

2. The system of claim 1, wherein the received incident report comprises a task associated with repairing software, repairing hardware, completing a purchase of an item, installing software, or updating software, or any combination thereof.

3. The system of claim 1, wherein the received incident report comprises a plurality of fields, wherein at least one of the plurality of fields has a field value, wherein the plurality of fields identify an originator of the received incident report, a description of the received incident report, a description of a task to be performed and associated with the received incident report, an identifier of an agent assigned to the received incident report, or a status of the received incident report, or any combination thereof.

4. The system of claim 3, wherein receiving the incident report comprises generating a graphical user interface configured to:
display the plurality of fields of the received incident report; and
receive respective field values in at least one of the plurality of fields, wherein the field values do not include a unique identifier of a configuration item.

5. The system of claim 1, wherein the database is configured to store:
the plurality of past incident reports, wherein each of the plurality of past incident reports is linked to one or more respective configuration items of the plurality of configuration items, wherein the plurality of configuration items are associated with a managed network and represent properties of one or more of computing devices or software applications deployed within the managed network;
the plurality of feature vectors, each representing information contained in fields of a respective one of the plurality of past incident reports; and
a trained computational model configured to generate the plurality of feature vectors from the plurality of past incident reports.

6. The system of claim 5, wherein the trained computational model is configured to compare the generated feature vector to at least one of the plurality of feature vectors based on one or more similarity values, each representing an extent of similarity between the generated feature vector and a different one of the plurality of feature vectors.

7. The system of claim 6, wherein an output of comparing the generated feature vector to the at least some of the plurality of feature vectors comprises a score representing a degree of similarity.

8. The system of claim 6, wherein identifying the set of candidate incident reports of the plurality of past incident reports that are potentially related to the received incident report comprises determining one or more past incident reports of the plurality of past incident reports having at least a predetermined similarity value with the feature vector generated for the received incident report.

9. A system, comprising:
a processor; and
a memory, accessible by the processor, and storing instructions that, when executed by the processor, cause the processor to perform operations comprising:
receiving an incident report that is not linked to a configuration item;
generating a feature vector for the received incident report, wherein the feature vector comprises a plurality of keys, each key of the plurality of keys having a respective key value, wherein each key of the plurality of keys corresponds to a respective word of a plurality of words in the incident report, and wherein the respective key value for each of the plurality of keys represents a number of occurrences of the respective word in the incident report;

comparing the generated feature vector to one or more feature vectors of a plurality of feature vectors stored in a database, wherein each of the plurality of feature vectors corresponds to a respective past incident report of a plurality of past incident reports stored in the database;

based on the comparison, identifying a set of candidate incident reports of the plurality of incident reports that are potentially related to the received incident report;

determining whether a particular configuration item of a plurality of configuration items stored in the database is associated with the received incident report based on whether the particular configuration item is linked to at least a threshold number of incident reports from the set of candidate incident reports;

in response to determining that none of the plurality of configuration items is associated with the received incident report, initiating a network discovery process to discover one or more new configuration items; and updating the plurality of configuration items to include the one or more new configuration items.

10. The system of claim 9, wherein updating the plurality of configuration items comprises updating a set of key words associated with the plurality of configuration items.

11. The system of claim 9, wherein the network discovery process comprises transmitting a plurality of respective probes from a server to one or more computing devices or software applications deployed within a managed network.

12. The system of claim 11, wherein the server is configured to receive and process responses to the respective probes received from the one or more computing devices or software applications deployed within the managed network.

13. The system of claim 9, wherein the set of candidate incident reports are each linked to one or more configuration items of a set of configuration items in the database.

14. The system of claim 13, wherein the set of configuration items are displayed on a graphical user interface comprising a suggestion region configured to (i) display potentially related configuration items from the set of configuration items, and (ii) receive selection of the particular configuration item from the set of configuration items.

15. The system of claim 9, wherein the operations comprise:
generating a graphical user interface comprising the received incident report and a region for prompting and receiving inputs indicative of attributes of a configuration item that is potentially related to the received incident report;
determining that at least some of the received inputs indicative of attributes match attributes of an existing configuration item stored in the database; and
automatically linking the existing configuration item to the received incident report.

16. The system of claim 15, wherein the inputs indicative of attributes comprise an Internet Protocol (IP) address, a uniform resource locator (URL), a service name, or a domain name, or any combination thereof.

17. A non-transitory, computer-readable medium storing instructions, that when executed by one or more processors, cause the one or more processors to perform operations comprising:
receiving an incident report that is not linked to a configuration item;
generating a feature vector for the received incident report, wherein the feature vector comprises a plurality of keys, each key of the plurality of keys having a respective key value, wherein each key of the plurality of keys corresponds to a respective word of a plurality of words in the incident report, and wherein the respective key value for each of the plurality of keys represents a number of occurrences of the respective word in the incident report;
comparing the generated feature vector to one or more feature vectors of a plurality of feature vectors stored in a database, wherein each of the plurality of feature vectors corresponds to a respective past incident report of a plurality of past incident reports stored in the database;
based on the comparison, identifying a set of candidate incident reports of the plurality of incident reports that are potentially related to the received incident report;
determining whether a particular configuration item of a plurality of configuration items stored in the database is associated with the received incident report based on whether the particular configuration item is linked to at least a threshold number of incident reports from the set of candidate incident reports;
in response to determining that the particular configuration item of the plurality of configuration items is associated with the received incident report:
linking the particular configuration item to the received incident report; and
storing, in the database, the link between the received incident report and the particular configuration item; and
in response to determining that none of the plurality of configuration items is associated with the received incident report:
initiating a network discovery process to discover one or more new configuration items; and
updating the plurality of configuration items to include the one or more new configuration items.

18. The non-transitory, computer-readable medium of claim 17, wherein the operations comprise generating a graphical user interface comprising a popup window overlaid on the received incident report, wherein the popup window displays questions arranged in a decision tree structure and receives inputs indicative of attributes of a configuration item to link to the received incident report.

19. The non-transitory, computer-readable medium of claim 17, wherein the operations comprise:
periodically identifying and linking configuration items to incident reports stored in the database to which no configuration items are linked; and
periodically initiating the network discovery process to discover the one or more new configuration items and update the plurality of configuration items to include the one or more new configuration items.

* * * * *